United States Patent Office 3,281,444
Patented Oct. 25, 1966

3,281,444
STABILIZATION OF ORGANIC ISOCYANATES
WITH ALKENYL KETONES AND ESTERS
David T. Manning, South Charleston, W. Va., assignor to Union Carbide Corporation, a corporation of New York
No Drawing. Filed May 9, 1963, Ser. No. 279,296
6 Claims. (Cl. 260—453)

This invention relates to isocyanate compositions, particularly an isocyanate composition stabilized from discoloration.

Isocyanates are typically colorless liquids or solids which are found to discolor on storage. Discoloration of isocyanates deleteriously affects their saleability typically because the color may be transferred to the product in which the isocyanate is employed. This is particularly so in the case of polyisocyanates used in resin manufacture.

It is herein provided an agent which significantly retards discoloration of the isocyanate product thus allowing storage of the isocyanate for reasonable periods of time prior to use. These agents are particularly effective when employed in solution with the isocyanate.

The agents employed in this invention for retarding discoloration of organic isocyanates are carboxylic acid esters and ketones containing at least one ethylenic unsaturation in conjugated position with the carbonyl moiety of the ester and ketone. Illustrative of such compounds are those characterized by the formula:

(I) 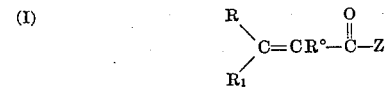

wherein R, R° and R¹ may be hydrogen; an alkyl radical typically of from 1 to 18 carbon atoms, preferably of from 1 to 8 carbon atoms; an alkenyl (including alkadienyl) radical typically of from 2 to 18 carbon atoms, preferably of from 2 to 8 carbon atoms; a cycloalkyl radical typically of from 4 to 8 carbon atoms, preferably of from 5 to 7 carbon atoms; an aryl radical, preferably monocyclic and bicyclic; a cycloalkenyl radical, preferably of from 5 to 7 carbon atoms; and the like; and Z is an organic radical and may be —R² and —OR² wherein R² may be any of the radicals defined above for R except hydrogen. In the preferred compounds of this invention, R and R° are hydrogen and R¹ is hydrogen, alkyl or alkenyl.

Thus the preferred compounds of this invention are characterized by the formula:

(II) 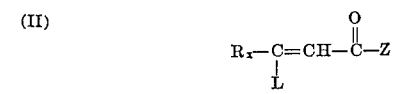

wherein Z is as defined above; $R_x$ may be hydrogen or any of the above defined alkyl, alkenyl, cycloalkyl, aryl, and cycloalkenyl radicals; and L may be hydrogen, or one of the alkyl and alkenyl radicals, as defined above for R¹.

Illustrative compounds which may be employed include esters such as methyl crotonate, ethyl crotonate, n-propyl crotonate, i-propyl crotonate, n-butyl crotonate, sec.-butyl crotonate, tert.-butyl crotonate, isobutyl crotonate, isopropenyl crotonate, 2-butenyl crotonate, methyl sorbate, ethyl sorbate, n-propyl sorbate, i-propyl sorbate, n-butyl sorbate, sec.-butyl sorbate, 2-ethylhexyl sorbate, isopropenyl sorbate, methyl cinnamate, ethyl cinnacate, n-propyl cinnamate, i-propyl cinnamate, n-butyl cinnamate, methyl 3-cyclohexylacrylate, ethyl 3-cyclohexylacrylate, propyl 3-cyclohexylacrylate, butyl 3-cyclohexylacrylate, methyl 2-ethyl-2-hexenoate, ethyl 2-ethyl-2-hexenoate, propyl 2-ethyl-2-hexenoate, butyl 2-ethyl-2-hexenoate, methyl 2-(p-tolyl)-2-pentenoate, ethyl 2(p-tolyl)-2-pentenoate, propyl 2-(p-tolyl)-2-pentenoate, butyl 2-(p-tolyl)-2-pentenoate, methyl 2,4,6-octatrienoate, ethyl 2,4,6-octatrienoate, propyl 2,4,6-octatrienoate, butyl 2,4,6-octatrienoate; and ketones such as, methyl vinyl ketone, ethyl vinyl ketone, n-propyl vinyl ketone, isopropyl vinyl ketone, n-butyl vinyl ketone, mesityl oxide, isopropenyl methyl ketone, isopropenyl ethyl ketone, 4-ethylidene-5-hexen-3-one, 3-ethyl-3-buten-2-one, 3-vinyl-3-buten-2-one, methyl propenyl ketone, ethyl propenyl ketone, 3,4-dimethyl-3-penten-2-one, 3-methyl-3-hepten-2-one, 3,4-dimethyl-3-hexen-2-one, 5,5-dimethyl-3-hexene-2-one, 4,5-dimethyl-4-hexen-3-one, benzalacetone, 1-naphthalacetone, 2-naphthalacetone; and the like.

The isocyanates which may be treated to retard discoloration are organic mono and polyisocyanates, such as aliphatic, cycloaliphatic and aromatic mono-, di-, tri- and/or other poly-isocyanates which tend to discolor under conditions of moisture and temperature typically associated with industrial storage procedures. Illustrative of organic isocyanates which are beneficially stabilized from discoloration include the following: tolylene-2,4 and 2,6 - diisocyanate, 4,4'-methylenediortho-tolylisocyanate, 2,4,4' - triisocyanatodiphenylether, toluene - 2,3,6 - triisocyanate, 1-methoxy-2,4,6-triisocyanatobenzene, m-phenylenediisocyanate, 4-chloro-m-phenylenediisocyanate, 4,4'-biphenyldiisocyanate, 1,5-naphthalenediisocyanate, 1,4-tetramethylenediisocyanate, 1,6 - hexamethylenediisocyanate, 1,10-decamethylenediisocyanate, 1,4-cyclohexanediisocyanate, 1,2-ethylenediisocyanate, diphenylmethane p,p' - diisocyanate, bis(p-isocyanatocyclohexyl)methane, stilbene diisocyanate, dixylylmethane diisocyanate, 2,2-bis(4-isocyanatophenyl)propane, diphenylmethane tetraisocyanates, trimethylbenzene triisocyanates, phenyltolylmethane triisocyanates, ditolylmethane triisocyanates, triphenylmethane triisocyanates, 3,3' - dimethyldiphenylene-4,4'-diisocyanates, 3,3' - dimethoxydiphenylene-4,4'-diisocyanate, diphenyl triisocyanates and isomers of bis (p,p'-isocyanatophenyl)cyclohexane.

The particular color retardation agent selected (color stabilizing agents) should be capable of dissolution in the particular isocyanate to be stabilized, regardless of whether the diisocyanate is a liquid at ambient temperature or must be warmed to transform it to the liquid state. The selected agent should be stable at the temperature of the isocyanate at the time of incorporation, and incorporation be effected at a temperature below that of decomposition or of any undesirable reaction of the isocyanate with itself or the agent. The agent, or mixtures of the agents, should be employed in the isocyanate in any amount sufficient to retard discoloration. Usually that amount falls between 0.005 and 5 percent by weight of the isocyanate. Preferably, the agent is employed in amounts from about 0.01 to 1.0 percent by weight of isocyanate. In general, this invention is directed to employing an amount of the agent sufficient to retard discoloration of the isocyanate.

The following serves to specifically illustrate operation of this invention, however, it is not intended to limit the scope of this invention.

Example 1

A dry 8-ounce glass bottle is purged with dry nitrogen and charged with a mixture of 130 grams of colorless, pure, freshly-distilled tolylene diisocyanate (80 weight percent 2,4-tolylene diisocyanate and 20 weight percent 2,6-tolylene diisocyanate) and 0.13 gram of n-butyl crotonate. The resulting composition is blanketed under dry nitrogen and the bottle securely sealed by wrapping its stopper with tape. A similar sample is prepared, but without the added n-butyl crotonate for use as a blank.

Both the blank and the n-butyl crotonate test samples are stored in the dark at room temperature, about 25° C. Examination after storage for 8 days reveals the development of a definite yellow color in the blank while the sample containing the agent is found not to have changed. After 34 days, the n-butyl crotonate sample is substantially unchanged.

Example II

On repetition of the procedure of Example I employing ethyl crotonate, mesityl oxide, and methyl vinyl ketone instead of n-butyl crotonate, the samples containing these compounds remain colorless for more than 12 days whereas the blanks compared with each of the above samples exhibit yellowing by 12 days.

Though the above relate to specifics of the present invention, this invention is not intended to be restricted thereby except insofar as these specifics appear in the claims.

What is claimed is:

1. A solution of an organic isocyanate and from between 0.005 and 5.0 percent by weight of the isocyanate of a compound having the formula:

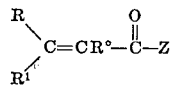

wherein R, R° and R¹ are each from the groups consisting of hydrogen, 1–18 carbon atom alkyl, 2–18 carbon atom alkenyl, 4–8 carbon atom cycloalkyl, 6–10 carbon atom aryl, and 5–7 carbon atom cycloalkenyl; Z is from the classes consisting of —$R^2$ and —$OR^2$, wherein $R^2$ is from said groups consisting of alkyl, alkenyl, cycloalkyl, aryl, and cycloalkenyl.

2. A solution of an organic isocyanate and from between 0.005 and 5.0 percent by weight of the isocyanate of a compound having the formula:

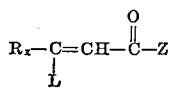

wherein $R_x$ is from the groups consisting of hydrogen, 1–18 carbon atom alkyl, 2–18 carbon atom alkenyl, 4–8 carbon atom cycloalkyl, 6–10 carbon atom aryl, and 5–7 carbon atom cycloalkenyl; Z is from the classes consisting of —$R^2$ and —$OR^2$, wherein $R^2$ is from said groups consisting of alkyl, alkenyl, cycloalkyl, aryl, and cycloalkenyl; and L is from the groups consisting of hydrogen, and said alkyl and alkenyl.

3. A solution of tolylene diisocyanate and from between 0.005 and 5.0 percent by weight of the diisocyanate of n-butyl crotonate.

4. A solution of tolylene diisocyanate and from between 0.005 and 5.0 percent by weight of the diisocyanate of ethyl crotonate.

5. A solution of tolylene diisocyanate and from between 0.005 and 5.0 percent by weight of the diisocyanate of mesityl oxide.

6. A solution of tolylene diisocyanate and from between 0.005 and 5.0 percent by weight of the diisocyanate of methyl vinyl ketone.

References Cited by the Examiner

UNITED STATES PATENTS

| | | | |
|---|---|---|---|
| 2,276,204 | 3/1942 | Kilgore | 252—300 |
| 2,356,849 | 8/1944 | Horback | 252—300 |

CHARLES B. PALMER, *Primary Examiner.*

DALE R. MAHANAND, *Assistant Examiner.*